(12) United States Patent
Chen

(10) Patent No.: US 7,379,294 B2
(45) Date of Patent: May 27, 2008

(54) QUICK PLUG/EJECT CONCEPT SATA HARD DISK DRIVE RACK

(76) Inventor: Gracie L. Chen, 11677 Palm Spring Ct., Cupertino, CA (US) 95014

( * ) Notice: Subject to any disclaimer, the term of this patent is extended or adjusted under 35 U.S.C. 154(b) by 63 days.

(21) Appl. No.: 11/542,062

(22) Filed: Oct. 3, 2006

(65) Prior Publication Data

US 2008/0080130 A1    Apr. 3, 2008

(51) Int. Cl.
*G06F 1/16* (2006.01)

(52) U.S. Cl. .................. 361/685; 312/330.1; 165/122; 713/323

(58) Field of Classification Search ............. 312/223.1, 312/330.1, 332.1; 713/320–323; 165/122, 165/80.5; 439/638, 639; 361/679–687, 361/724–727
See application file for complete search history.

(56) References Cited

U.S. PATENT DOCUMENTS

| 5,214,570 | A  | * | 5/1993  | Shah et al. ................. 361/684 |
| 6,483,107 | B1 | * | 11/2002 | Rabinovitz et al. ......... 250/239 |
| 2006/0028805 | A1 | * | 2/2006 | Hidaka ........................ 361/754 |
| 2006/0039106 | A1 | * | 2/2006 | Hidaka ........................ 361/685 |

* cited by examiner

*Primary Examiner*—Hung Van Duong
(74) *Attorney, Agent, or Firm*—Chiaoyun Kuo

(57) ABSTRACT

A quick plug/eject concept 3.5" SATA HDD rack comprises a casing, a HDD holding set, a HDD ejecting set, a HDD vibration reduction and static electronics proof set, a Serial ATA connector (the receptacle part), and a plug-in sensor. The design of a HDD holding set and a HDD ejecting set allows user to install and uninstall a 3.5" SATA HDD by hand plug/eject movements without tool (i.e. toolless). HDD vibration reduction and static electronics proof set enhances the stability and security of the HDD by avoiding accidents caused by 3.5" HDD vibration and electrical short circuit. The Serial ATA connector provides a SATA signal connecting structure without an extra connector that might reduce the high frequency signal.

5 Claims, 6 Drawing Sheets

QUICK PLUG/EJECT CONCEPT SATA HARD DISK DRIVE RACK

FIELD OF INVENTION

The invention relates to a hard disk drive (HDD) rack, and more particularly, a 3.5" Serial ATA (SATA) portable HDD rack that fits in the 5.25" drive bay in personal computer (PC) and Informational Technology (IT) storage devices.

DESCRIPTION OF THE PRIOR ART

HDD is one of the key components for the PC in which the user installs an operating system, software and various files the user creates. Due to the demands on speed, capacity and efficiency, Serial ATA HDDs are more and more popular and gradually replace the old Parallel ATA HDDs. Users also use extra SATA HDDs as extra storage devices in PC drive bays or in stand-alone storage towers.

Because 3.5" HDD is sensitive to vibration, when being installed in a drive bay, it usually must be secured in place in a drive holder or rack with several screws, and then secured into the bay itself with more screws. To uninstall the drive, users either need to open the PC case and unscrew the drive, or have to take out the rack and unscrew it. The invention via unique mechanic sets provides a convenient way to plug and eject SATA HDD easily. After the rack installed in PC drive bay, users can swap HDD from front side of PC without opening PC case and using any tool and screws.

SUMMARY OF THE INVENTION

Accordingly, it is an object of the present invention to provide a 3.5" SATA HDD rack that a user can plug in or eject a SATA HDD from PC or storage device without any screws or slider mounted on the drive. To enhance the physically stability and security of the HDD installed, the invention provides a vibration reduction and static electronics proof structure to the SATA HDD. It also provides a SATA signal connecting structure without an extra connector that might reduce the high frequency signal.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

The following description of the preferred embodiments discloses specific configurations, data value, and components. The description of various features and structures of the present invention which would be known to one skilled in the art are omitted for the sake of clarity and brevity.

Figure 1:
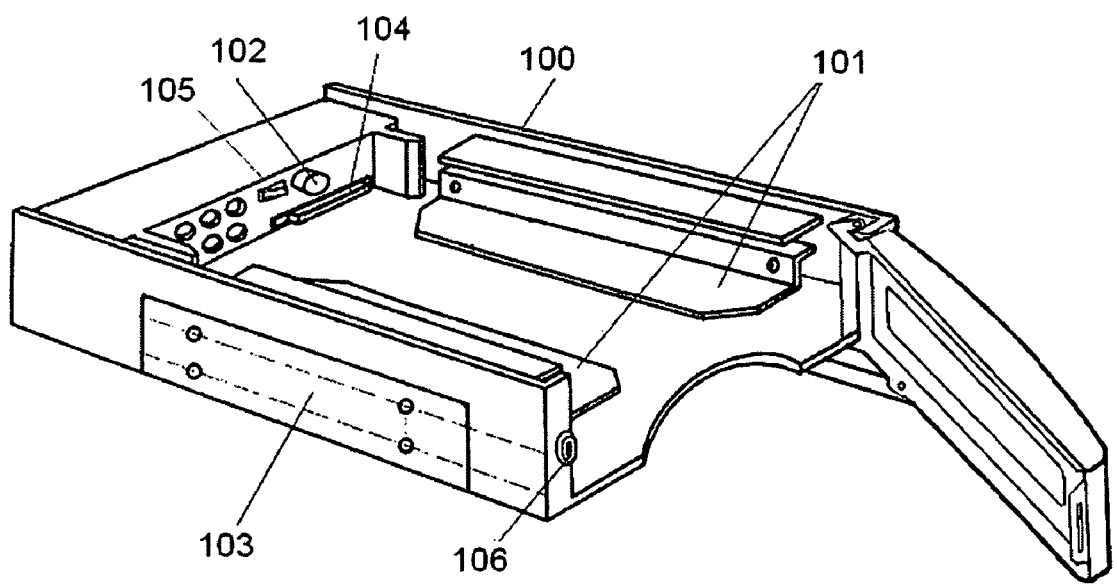
FIG. 1 is a perspective view illustrating the invention.

FIG. 1 shows the perspective view of the rack 100 and six main sets and parts of the invention: HDD holding set 101, HDD ejecting set 102, HDD vibration reduction and static electronics proof set 103, SATA connector 104, plug-in sensor 105, and door lock 106. There will be a detailed description of HDD holding set 101, HDD ejecting set 102 and HDD vibration reduction and static electronics proof set 103 in FIG. 2.

The SATA connector 104, with a SATA signal cable and a power cable connecting the rack directly to the PC, does not need an extra transmitter connector. It prevents or reduces SATA high frequency signal loss due to requirement of an extra connector.

The plug-in sensor 105 functions to detect the rack's physical status (empty or full). The lock 106 provides protection and security to the HDD. It also prevents accidental ejection of the HDD.

Figure 2:
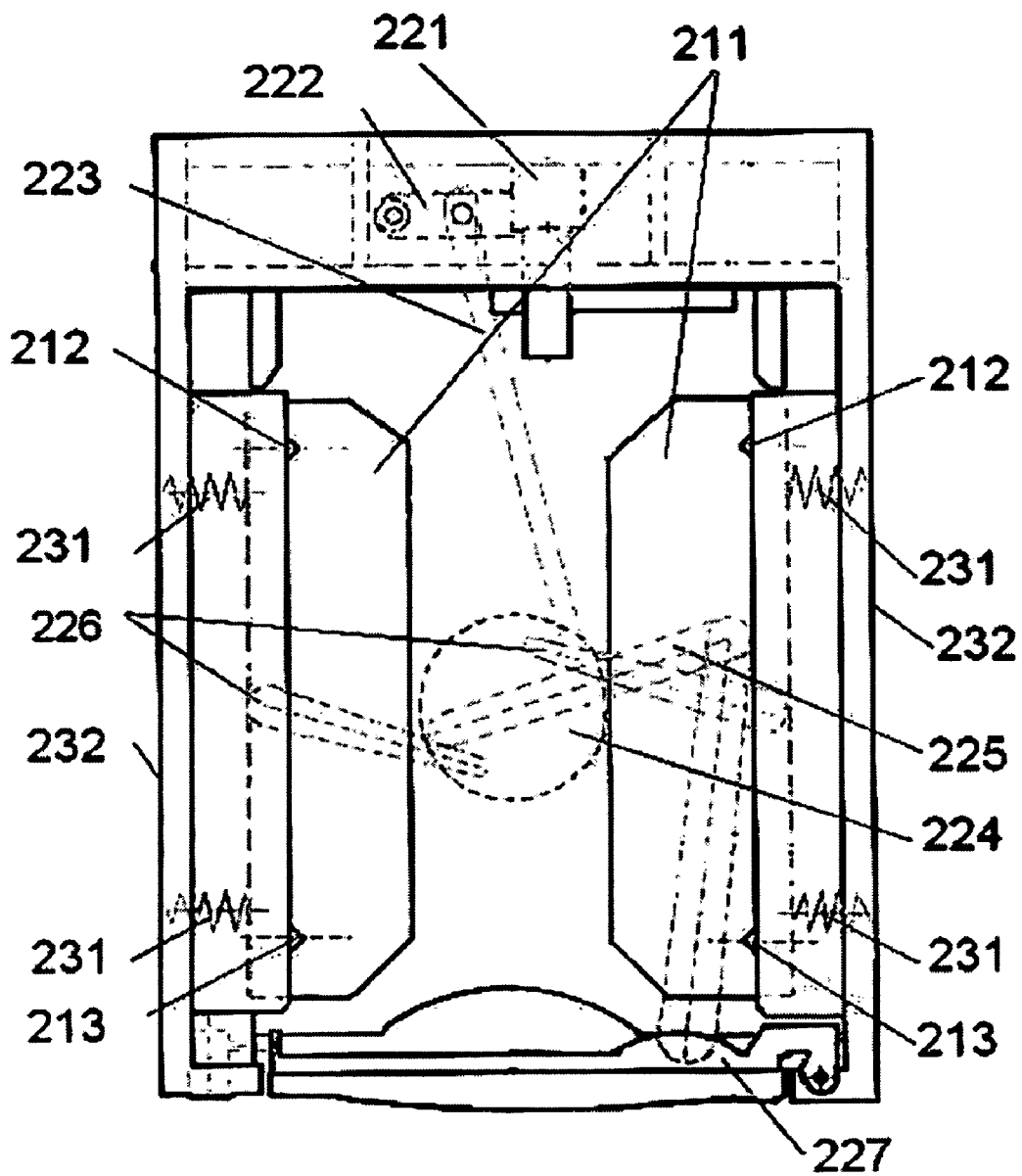
FIG. 2 is a top view of the invention showing details of HDD holding set, HDD ejecting set, and HDD vibration reduction and static electronics proof set.

FIG. 2 is a top view of the invention which specifically shows the details of three sets of the invention. The first set is HDD holding set which includes movable 90° Z-shaped metal sheets 211 placed along the long sides of the rack. Four cone-shaped point fastening pins 212 and 213 are fixed on four specific positions of the vertical sides of the Z-shaped metal sheets 211. The four pins 212 and 213 are designed to replace traditional 6-32 UNC-28 screws that fit the four mounting holes on the two sides of the 3.5" HDD.

The second set is HDD ejecting set which includes ejecting pole 221; ejecting rod 222; inner connecting rod 223; turntable 224; door rod unit 225; two side rods 226 that control the movement of Z-shaped metal sheets 211; and rack door 227.

When a HDD is inserted or plugged in the rack and the rack door 227 is pushed to close, the force that closes the rack door 227 pushes door rod unit 225, which then rotate the turntable 224. The rotation of turntable 224 then pushes inner connecting rod 223 and side rods 226. The movement of inner connecting rod 223 pulls ejecting rod 222 that also push ejecting pole 221 inward. When side rods 226 are moved by turntable 224, they pull the Z-shaped metal sheets 211 toward the inserted HDD and the four cone-shaped point fastening pins 212 and 213 fittingly poked in the HDD mounting holes. When the HDD is plugged in, the HDD SATA connector and the rack SATA receptacle are in fully mated condition, so that the plug-in sensor 105 is triggered. Thus, the 3.5" HDD is plugged in by easy hand push and closing door movements.

To remove or eject the HDD, the user just pulls the rack door 227. The outward movement of rack door 227 will trigger the movements of door rod unit 225, the turntable 224, side rods 226, inner connecting rod 223 and ejecting rod 222. Simultaneously, side rods 226 will move the Z-shaped metal sheets 211 from HDD to release the HDD and ejecting rod 222 will move the ejecting pole 221, which pushes the HDD out.

On the whole, the design of HDD holding set and HDD ejecting set and is to allow a user to install and uninstall a 3.5" HDD with quick plug and eject similar to that of floppy disk.

The third set is HDD vibration reduction and static electronics proof set. It includes four metal springs 231 and a 90° U-shaped metal sheet 232 covering the bottom and the long sides of the rack. The four metal springs 231 not only facilitate the stability of HDD, but also reduce the HDD vibration. Any static electricity on the HDD surface will be transferred to metal springs 231 and U-shaped metal sheet 232 to the PC case or storage device case.

Figure 3:
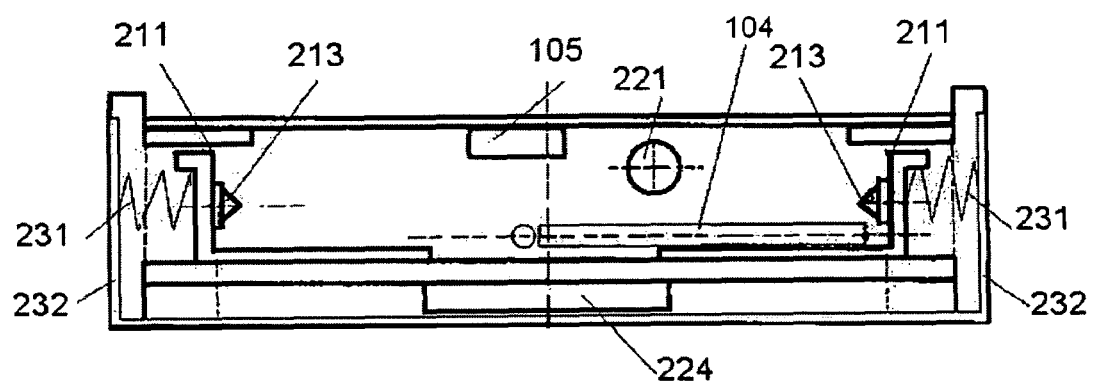
FIG. 3 is a front view of the invention showing the Z-shaped metal sheet of the HDD holding set and the U-shaped metal sheet of the HDD vibration reduction and static electronics proof set.
Figure 4:
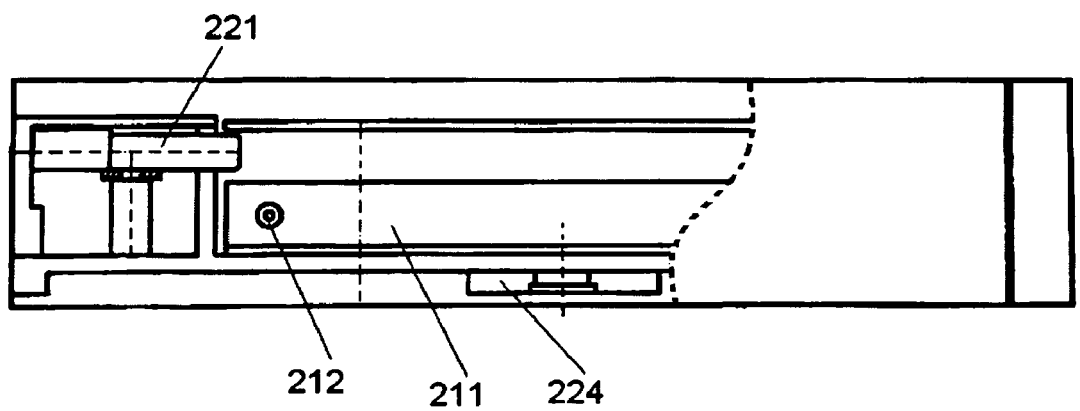
FIG. 4 is a side view of the invention.

FIG. 3 is front view of the invention. Two pieces of movable 90° Z-shaped metal sheets 211 are symmetrically placed along the long sides of the rack. And a 90° U-shaped metal sheet 232 covers the bottom and the long sides of the rack.

Figure 5:
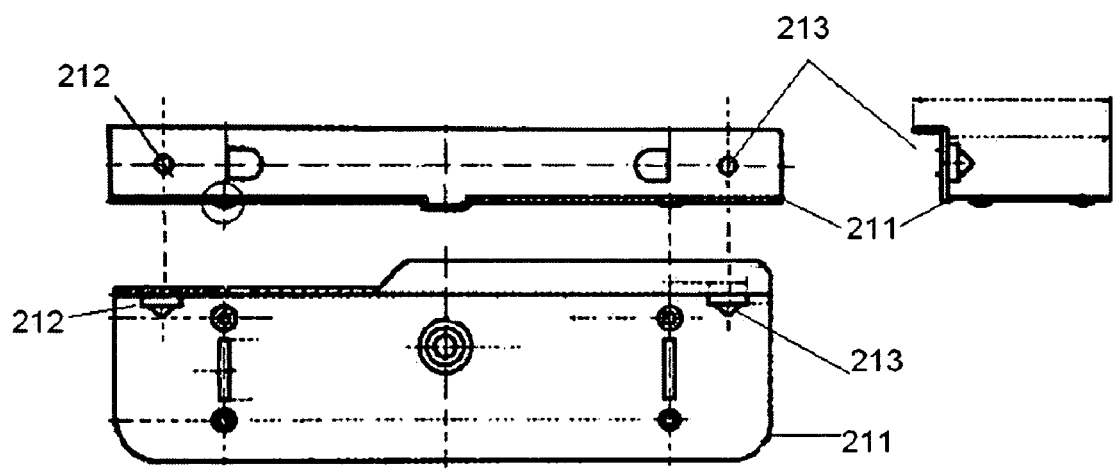
FIG. 5 is side view and top view of the HDD holding set.

FIG. 5 has a side view and a top view of the HDD holding set. The position of the center point of the cone-shaped point fastening pins 212 and 213 is a critical design for the invention. In accordance with 3.5" HDD specifications set by Technical Committee T13, when a HDD is correctly inserted in the rack, either tip of the cone-shaped point fastening pins 212 is 1.122"±0.02" from the SATA signal connector end of the 3.5" HDD and 0.25"+0.01" from bottom (the Printed Circuit Board side) of HDD. The distance between the tips of the cone-shaped point fastening pins 212 and 213 is 4"±0.01 on the same side of Z-shaped metal sheets 211. Thus, the HDD holding set can fasten the HDD firmly by inserting the four cone-shaped point fastening pins 212 and 213 into the four mounting holes on the sides of the HDD. Thus, the rack can fasten the HDD without screws or tools. It also provides the flexibility that readily fits to HDDs of various designs.

Figure 6:
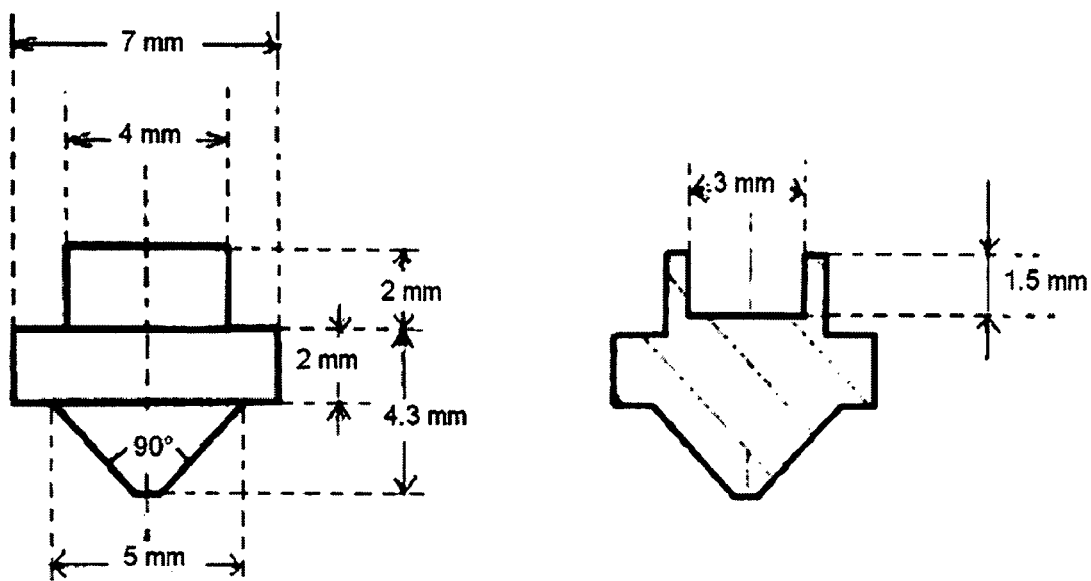
FIG. 6 is the anatomy of the cone-shaped point fastening pin of the HDD holding set.

FIG. 6 is the anatomy of the cone-shaped point fastening pins 212 and 213. To accommodate the size of the mounting holes of 3.5" HDDs, the length, diameter, and angle of the cone-shaped tip are 2.3 mm, 5 mm, and 90°, respectively. The total length of the cone-shaped point fastening pin is 6.3 mm, which is the precise length to hold the HDD firmly when the Z-shaped metal sheets 211 are pulled toward the HDD.

What is claimed is:

1. A quick plug/eject concept 3.5" Serial ATA hard disk drive rack to house a 3.5" Serial ATA hard disk drive and fit in personal computer standard 5.25" drive bay, comprising:
   a casing;
   a hard disk drive holding set;
   a hard disk drive ejecting set;
   a hard disk drive vibration reduction and static electronics proof set;
   a Serial ATA connector (the receptacle part);
   a plug-in sensor; and
   a door lock.

2. The quick plug/eject concept 3.5" Serial ATA hard disk drive rack of claim 1, wherein said hard disk drive holding set comprises two pieces of 90° Z-shaped metal sheets and four cone-shaped point fastening pins.

3. The hard disk drive holding set of claim 2, wherein the positions and sizes of said four cone-shaped point fastening pins are designed to fit to the four mounting holes on the long sides of the 3.5" Serial ATA hard disk drive in accordance with 3.5" HDD specifications set by Technical Committee T13.

4. The quick plug/eject concept 3.5" Serial ATA hard disk drive rack of claim 1, wherein said hard disk drive ejecting set comprises an ejecting pole, an ejecting rod, an inner connecting rod, a turntable, two side rods, a door rod unit and a rack door.

5. The quick plug/eject concept 3.5" Serial hard disk drive rack of claim 1, wherein said hard disk drive vibration reduction and static electronics proof set comprises four metal springs and a 90° U-shaped metal sheet which covers the bottom and the long sides of the rack.

* * * * *